United States Patent
Zhao et al.

(10) Patent No.: US 12,502,372 B2
(45) Date of Patent: Dec. 23, 2025

(54) (9BETA-H)-PIMARANE MOTHER NUCLEUS DITERPENOID COMPOUND WITH ANTI-COLON CANCER ACTIVITY AND DERIVATIVE THEREOF, AND PREPARATION METHOD THEREOF

(71) Applicant: NANJING UNIVERSITY OF CHINESE MEDICINE, Nanjing (CN)

(72) Inventors: Ming Zhao, Nanjing (CN); Jinao Duan, Nanjing (CN); Junfei Zhou, Nanjing (CN); Lu Fan, Nanjing (CN); Cai Lu, Nanjing (CN); Mingming Xu, Nanjing (CN); Di Di, Nanjing (CN); Sheng Guo, Nanjing (CN); Shulan Su, Nanjing (CN)

(73) Assignee: NANJING UNIVERSITY OF CHINESE MEDICINE, Nanjing (CN)

( * ) Notice: Subject to any disclaimer, the term of this patent is extended or adjusted under 35 U.S.C. 154(b) by 0 days.

(21) Appl. No.: 18/738,089

(22) Filed: Jun. 10, 2024

(65) Prior Publication Data
US 2024/0366554 A1  Nov. 7, 2024

Related U.S. Application Data

(63) Continuation of application No. PCT/CN2024/081800, filed on Mar. 15, 2024.

(30) Foreign Application Priority Data

May 22, 2023 (CN) .......................... 202310579790.2

(51) Int. Cl.
*A61K 31/343* (2006.01)
*A61K 36/185* (2006.01)
*A61P 35/00* (2006.01)

(52) U.S. Cl.
CPC .......... *A61K 31/343* (2013.01); *A61K 36/185* (2013.01); *A61P 35/00* (2018.01); *A61K 2236/15* (2013.01); *A61K 2236/17* (2013.01); *A61K 2236/33* (2013.01); *A61K 2236/35* (2013.01); *A61K 2236/39* (2013.01); *A61K 2236/51* (2013.01)

(58) Field of Classification Search
CPC ...... A61K 31/343; A61K 36/185; A61P 35/00
See application file for complete search history.

(56) References Cited

FOREIGN PATENT DOCUMENTS

| CN | 108264462 A | 7/2018 |
|----|-------------|--------|
| CN | 110204592 A | 9/2019 |

OTHER PUBLICATIONS

Armel Diatta, et al, Antiplasmodial Activity of the Ethanolic Extract of *Icancina oliviformis* (stems), *Spondias purpurea* L. (leaves, Barks and Roots) and *Cocos nucifera* L. (Coconut shell Fibers) From Zignuichor, Senegal. ejbps, 2018, vol. 5, Issue 6 881-886. (Year: 2018).*

Yu-Dong Shen, et al., Natural tanshinone-like heterocyclic-fused ortho-quinones from regioselective Diels-Alder reaction: Synthesis and cytotoxicity evaluation, European Journal of Medicinal Chemistry, vol. 44, Issue 10, 2009, pp. 3915-3921 (Year: 2009).*

Mingming Xu et al., structurally diverse(9β-H)-pimarane derivatives with six frameworks from the leave of Icacina oliviformis and their cytotoxic activities «Phytochemistry» 113804(1 of 12 to12 of 12) Publication date: Aug. 3, 2023.

Meng Sun et al., (9βH)- and 17-Nor-Pimaranes from Icacina oliviformis Journal of Natural Products: p. 949-955 Publication date: : Mar. 26, 2021.

* cited by examiner

*Primary Examiner* — Adam C Milligan
*Assistant Examiner* — Ernesto Valle, Jr.
(74) *Attorney, Agent, or Firm* — CBM PATENT CONSULTING, LLC

(57) ABSTRACT

The invention discloses a (9β-H)-pimarane skeleton diterpenoids with anti-colon cancer activity and a derivative thereof, and further discloses a preparation method and application of the compounds above; the invention finds that novel skeleton compounds 1 and 2 have certain inhibition effects on colon cancer cells, wherein the compound 2 has remarkable anti-proliferation effects on two colon cancer cell lines HT-29 and SW620, and the effects are both stronger than those of a positive drug 5-fluorouracil, so that the compound has the potential of being developed into a new anti-colon cancer drug.

3 Claims, 18 Drawing Sheets

(9BETA-H)-PIMARANE MOTHER NUCLEUS DITERPENOID COMPOUND WITH ANTI-COLON CANCER ACTIVITY AND DERIVATIVE THEREOF, AND PREPARATION METHOD THEREOF

CROSS-REFERENCE TO RELATED APPLICATIONS

This application is the U.S. Continuing Application of International Application No. PCT/CN2024/081800 filed on 15 Mar. 2024 which designated the U.S. and claims priority to Chinese Application No. CN202310579790.2 filed on 22 May 2023, the entire contents of each of which are hereby incorporated by reference.

TECHNICAL FIELD

The present invention belongs to the field of medicine, and particularly relates to a (9β-H)-pimarane skeleton derivative with anti-colon cancer activity, and a preparation method and application thereof.

BACKGROUND

Colon cancer, as the third most common malignant tumor, is second only to lung cancer and gastric cancer, and an incidence rate of the colon cancer ranks third among male malignant tumors and second among female malignant tumors, wherein the incidence rate of the colon cancer is significantly increased. The colon cancer is one of the most prominent health killers in the world, which has the characteristics of high incidence rate, easy recurrence, poor prognosis and high mortality.

Main clinical treatments for the colon cancer comprise surgical resection, radiotherapy, chemotherapy, immunotherapy, molecular targeted therapy, and the like. The surgical resection is mainly suitable for patients with early localized metastasis, such as a stage-I colon cancer, while stage-II and stage-III colon cancers are treated with surgery combined with the chemotherapy, and an advanced colon cancer is mainly treated with the chemotherapy. It can be seen that the chemotherapy plays an important role in the treatment of colon cancers of all stages, and has become the main treatment method of the colon cancer. 5-fluorouracil (5-FU), Oxaliplatin and Irinotecan are commonly used chemotherapy drugs in clinical treatment of the colon cancer, wherein the 5-FU, as a basic drug for the colon cancer, has been an important principal chemotherapy drug for more than 40 years, with a remarkable curative effect and a wide anti-cancer spectrum. However, the 5-FU will bring strong side effects and irreversible drug resistance to patients. In view of the strong toxic and side effects of the 5-FU and other chemotherapy drugs for the colon cancer, which affect the quality of life of patients, it is urgent to study and find a new anti-cancer drug with a good curative effect and low toxic and side effects. Therefore, it is of great significance to separate and screen non-toxic or low-toxic natural anti-tumor effective components from plants.

*Icacina oliviformis* (Poir.) J. Raynal is a perennial drought-resistant shrub of *Icacina* of Icacinaceae, and mainly distributed in central and western Africa. A tuber of *I. oliviformis* is rich in starch, and may also be used as food to satisfy people's hunger during famine. In addition, this plant also has a rich medicinal value, and local people use the tuber as a medicinal material to treat various diseases, such as poisoning, constipation and malaria; and an alcohol-soaked object of the tuber is also used by local people as a first-aid medicine to deal with some emergencies such as food poisoning. Modern pharmacological research shows that the *I. oliviformis* has many activities, such as anti-tumor, anti-convulsion, sedation, analgesia, hypoglycemia, bacteriostasis and seed germination inhibition. At present, researches on the *I. oliviformis* mostly focus on the tuber, and there is still the absence of research on a chemical composition of leaves. In addition, compared with the tuber, the leaves have a strong regeneration ability and rich sources, and are an environment-friendly natural resource.

SUMMARY

One object of the present invention is to deeply study active components of leaves of *I. oliviformis*, and to separate two novel 3,4-seco-17-nor-pimarane skeleton compounds from dry leaves of the plant *I. oliviformis*, which are named secoicacinlivitholide F (1) and secoicacinlivitholide G (2). Another object of the present invention is to screen out a preparation method of such type of novel skeleton compounds.

It is found from activity evaluation of the present invention that the compounds secoicacinlivitholide F and secoicacinlivitholide G have certain activity of inhibiting the proliferation of colon cancer cells, especially the compound secoicacinlivitholide G has remarkable anti-proliferation effects on two colon cancer cell lines HT-29 and SW620, and the effects are both stronger than those of a positive drug 5-fluorouracil. In addition, the inhibiting effect of the compound secoicacinlivitholide G on the colon cancer cell line HT-29 is about three times that of the positive drug 5-FU, so that the compound may be used for preparing an anti-colon cancer drug or used as a lead compound in the development of the anti-colon cancer drug.

The present invention provides the following technical solution: a (9β-H)-pimarane skeleton derivative with anti-colon cancer activity comprises a compound with the following general structural formula:

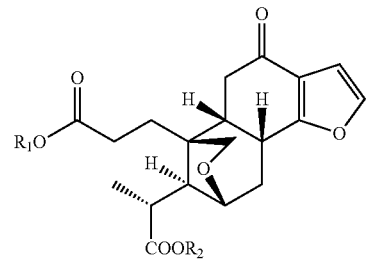

wherein, $R_1$ and $R_2$ are both hydrogen, acyl, glycosyl, alkyl, cycloalkyl, alkylaryl, aryl, arylalkyl, arylalkenyl, arylalkynyl, or heterocyclyl.

As a preferred solution, according to the (9β-H)-pimarane skeleton derivative above, $R_1$ and $R_2$ are hydrogen or alkyl.

As a more preferred solution, $R_1$ is hydrogen or methyl, and $R_2$ is hydrogen, which are selected from the following compound:

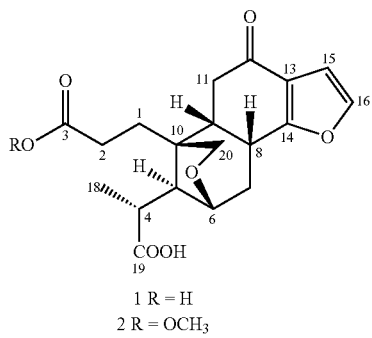

1 R = H
2 R = OCH₃

A preparation method of the novel two (9β-H)-pimarane diterpenoid skeleton compounds of the present invention comprises the following steps of:

(1) weighing and crushing dry *I. oliviformis* leaves, adding an ethanol or methanol aqueous solution to extract at room temperature, filtering the mixture and then collecting a filtrate, and concentrating the filtrate under a reduced pressure until non-alcoholic taste to obtain a concentrated solution;

(2) extracting the concentrated solution obtained in the step (1) with petroleum ether, ethyl acetate and n-butanol respectively, and concentrating the extracts under a reduced pressure to obtain a petroleum ether fraction, an ethyl acetate fraction and an n-butanol fraction;

(3) separating the n-butanol fraction obtained in the step (2) by MCI reversed-phase medium-pressure preparative chromatography, and eluting with mixed solvents of methanol and water at different volume ratios;

(4) subjecting an eluate flow fraction Bu-1 of 47.00 minutes to 55.00 minutes obtained in the step (3) to MCI reversed-phase medium-pressure preparative gradient elution, and collecting an eluate Bu-1-7 of 55.00 minutes to 65.00 minutes; and subjecting the flow fraction Bu-1-7 to semi-preparative high-performance liquid chromatography to obtain secoicacinlivitholide F (1); and (5) subjecting an eluate flow fraction Bu-2 of 55.00 minutes to 63.00 minutes obtained in the step (3) to MCI reversed-phase medium-pressure preparative gradient elution, and collecting an eluate Bu-2-10 of 65.00 minutes to 74.00 minutes; and subjecting the flow fraction Bu-2-10 to semi-preparative high-performance liquid chromatography to obtain secoicacinlivitholide G (2).

As a preferred solution, the preparation method of the present invention comprises the following steps of:

(1) weighing and crushing 1.3 kg of dry *I. oliviformis* leaves, adding 13 L of ethanol with a volume concentration of 95% to soak medicinal materials at room temperature for three times, each time for 12 hours, filtering the mixture and then collecting a filtrate, and concentrating the filtrate under a reduced pressure until no alcohol smell exists to obtain an extractum;

(2) preparing the medicine liquid obtained in the step (1) into a suspension with a proper amount of water, and then extracting the suspension with petroleum ether, ethyl acetate and n-butanol respectively for four times to obtain a petroleum ether fraction, an ethyl acetate fraction, an n-butanol fraction and a raffinate fraction respectively;

(3) mixing the n-butanol fraction obtained in the step (2) with a sample according to sample:MCI=1:1.2, and subjecting the mixture to medium-pressure preparative-MCI column chromatographic gradient elution (with an MCI particle size of 75 μm to 150 μm, 3.0 cm×60.0 cm, and a column volume of 400 mL) with methanol-water as a mobile phase for elution, wherein A is pure water, and B is methanol; elution gradients comprise: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; 70.00 minutes to 90.00 minutes, 55% to 55% B; 90.00 minutes to 110.00 minutes, 65% to 65% B; 110.00 minutes to 130.00 minutes, 75% to 75% B; and 130.00 minutes to 160.00 minutes, 75% to 100% B; an elution flow rate is 20 mL/min, and detection wavelengths are 250 nm and 310 nm; and after analysis by high-performance liquid chromatography, concentrating and combining the eluates by a rotary evaporator to obtain four fractions Bu-1 to Bu-4;

(4) subjecting the eluate flow fraction Bu-1 of 47.00 minutes to 55.00 minutes obtained in the step (3) to MCI reversed-phase medium-pressure preparative gradient elution with methanol-water as a mobile phase, wherein A is pure water, and B is methanol; elution gradients comprise: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; and 70.00 minutes to 120.00 minutes, 45% to 95% B; an elution flow rate is 20 mL/min, and detection wavelengths are 250 nm and 310 nm; collecting the eluate Bu-1-7 of 55.00 minutes to 65.00 minutes; subjecting the fraction Bu-1-7 to semi-preparative high-performance liquid chromatography with pure water (A)-acetonitrile (B) as a mobile phase for isocratic elution ($CH_3CN—H_2O$, v/v, 41:59), and collecting a stock solution of the compound 1 in a period of 53 minutes to 57 minutes; and purifying the stock solution of the compound 1 by semi-preparative high-performance liquid chromatography to obtain compound secoicacinlivitholide F, wherein a chromatographic column pressure is 9.8 MPa, a column temperature is 22° C. to 26° C., the mobile phase is pure water-acetonitrile at a volume ratio of 60:40, an injection volume is 100 μL, a flow rate is 3 mL/min, and a detection wavelength is 250 nm; and (5) subjecting the eluate flow fraction Bu-2 of 55.00 minutes to 63.00 minutes obtained in the step (3) to MCI reversed-phase medium-pressure preparative gradient elution with methanol-water as a mobile phase for elution, wherein A is pure water, and B is methanol; elution gradients comprise 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; and 70.00 minutes to 90.00 minutes, 55% to 55% B; and 90.00 minutes to 130.00 minutes, 55% to 95% B; an elution flow rate is 20 mL/min, and detection wavelengths are 250 nm and 310 nm; collecting the eluate Bu-2-10 of 65.00 minutes to 74.00 minutes; subjecting the fraction Bu-2-10 to semi-preparative high-performance liquid chromatography with pure water (A)- acetonitrile B as a mobile phase for isocratic elution (CH$_3$CN—H$_2$O, v/v, 40:60), and collecting a stock solution of the compound 2 in a period of 50 minutes to 54 minutes; and purifying the stock solution by semi-preparative high-performance liquid chromatography to obtain compound secoicacinlivitholide G.

A proliferation inhibition experiment is carried out on HT-29 colon cancer cells as an activity experiment, a clinical 5-FU drug is selected as a positive control drug, and an IC$_{50}$ (median inhibition concentration) value of the HT-29 colon cancer cells of the compound is tested by an MTT method, which finally proves that the above two compounds have good anti-colon cancer effects. An application of the above compound in preparing an anti-colon cancer drug is provided.

Beneficial Effects

The present invention finds the two novel 3,4-seco-17-nor-pimarane skeleton compounds secoicacinlivitholide F and secoicacinlivitholide G from the West African plant *I. oliviformis*, and provides an extraction and separation technology, a structural identification method and an application in anti-proliferation of colon cancer cells for the compounds.

DETAILED DESCRIPTION

Embodiment 1

Figure 1:
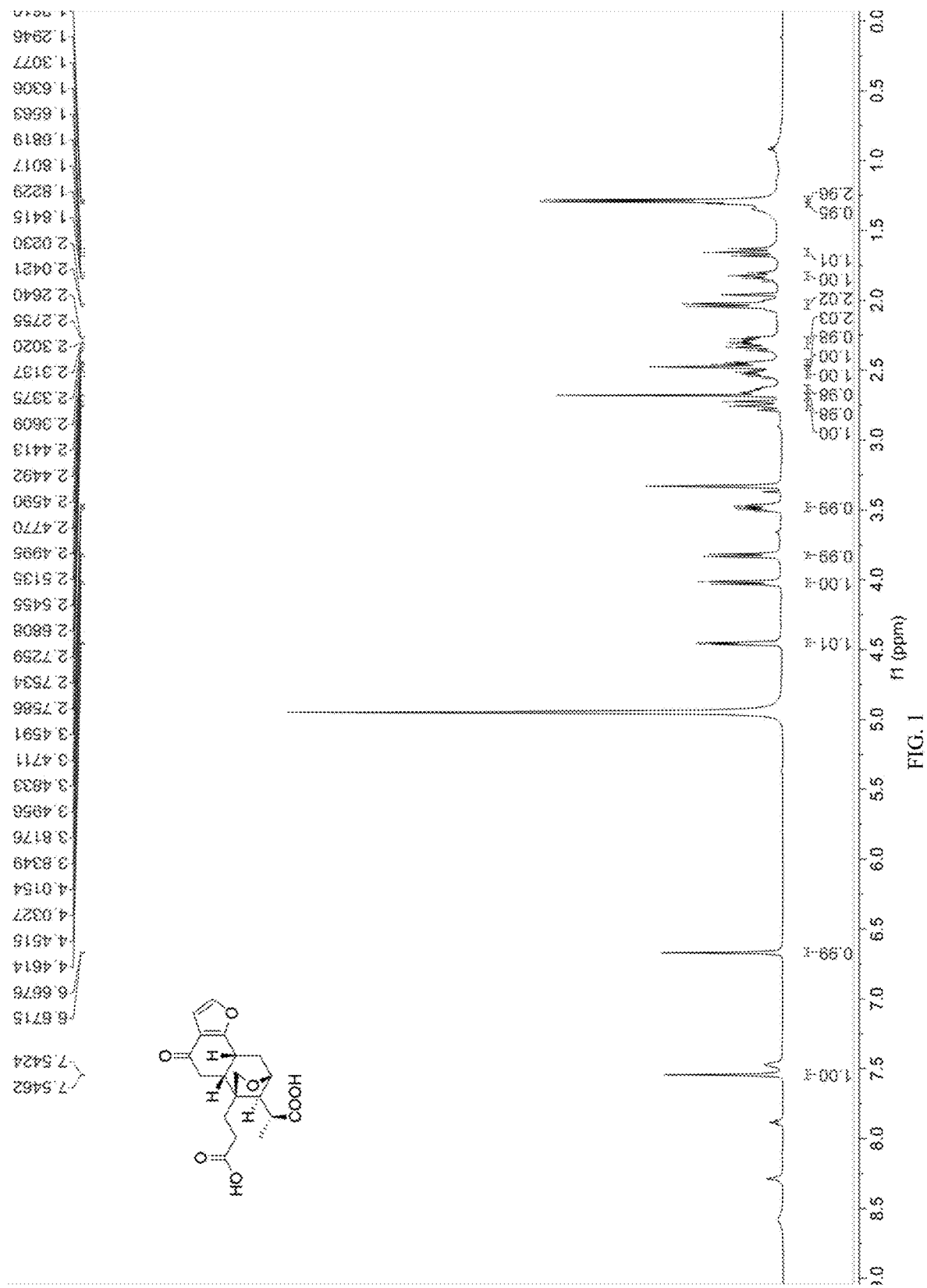
FIG. 1 is a $^1$H NMR spectrum of compound 1 (500 MHz, Methanol-d$_4$).
Figure 2:
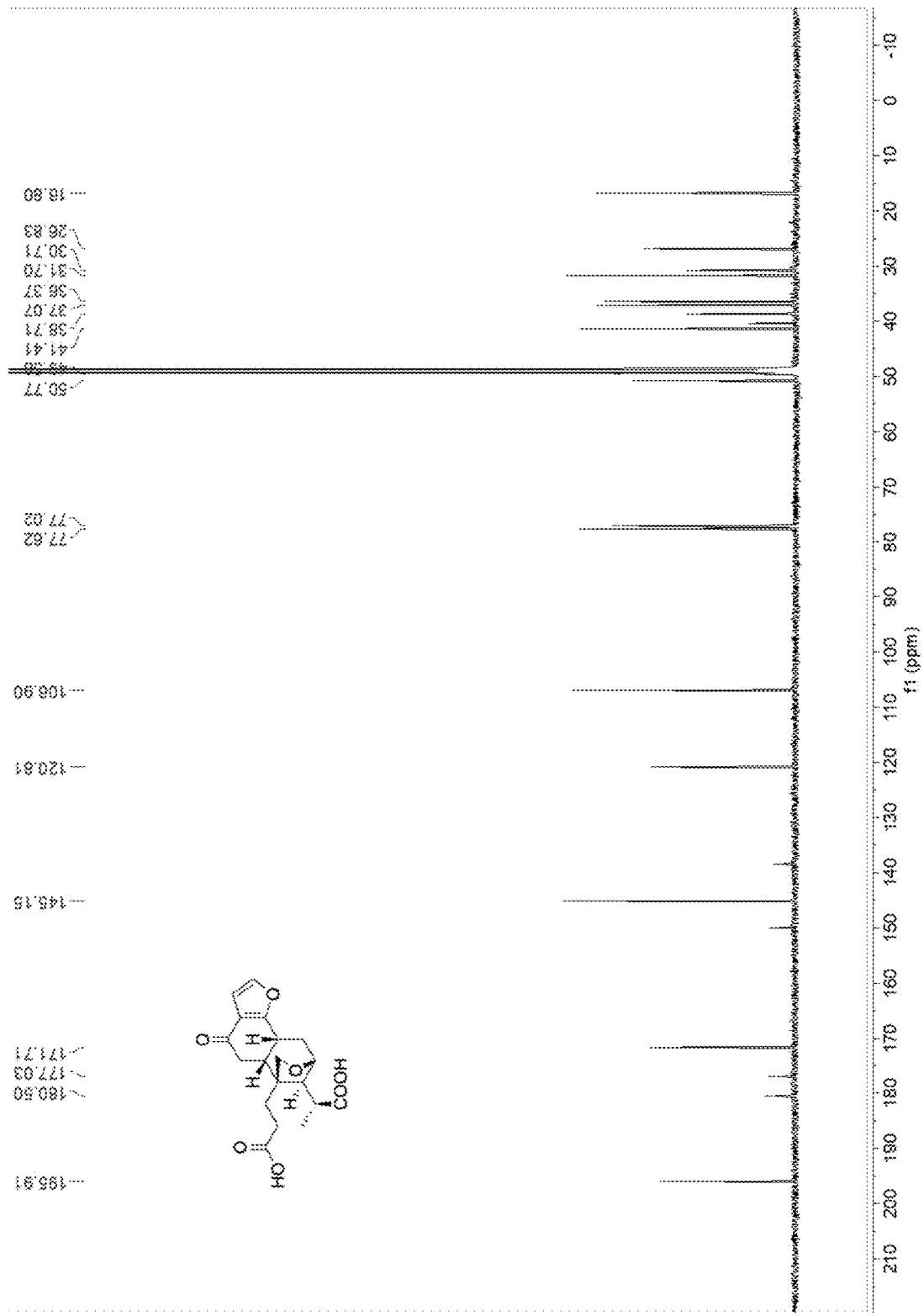
FIG. 2 is a $^{13}$C NMR spectrum of compound 1 (125 MHz, Methanol-d$_4$).
Figure 3:
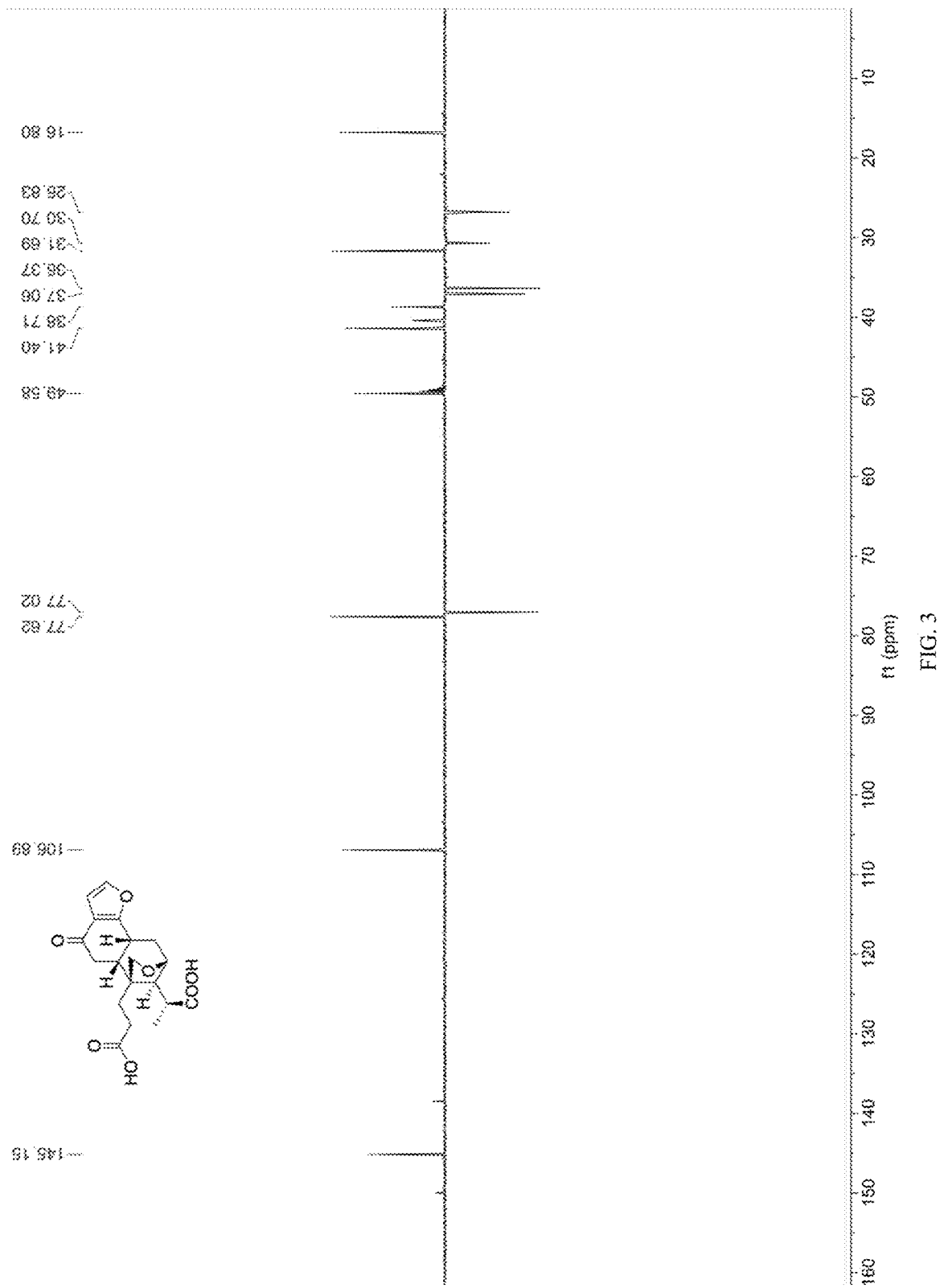
FIG. 3 is a DEPT 135 spectrum of compound 1 (125 MHz, Methanol-d$_4$).
Figure 4:
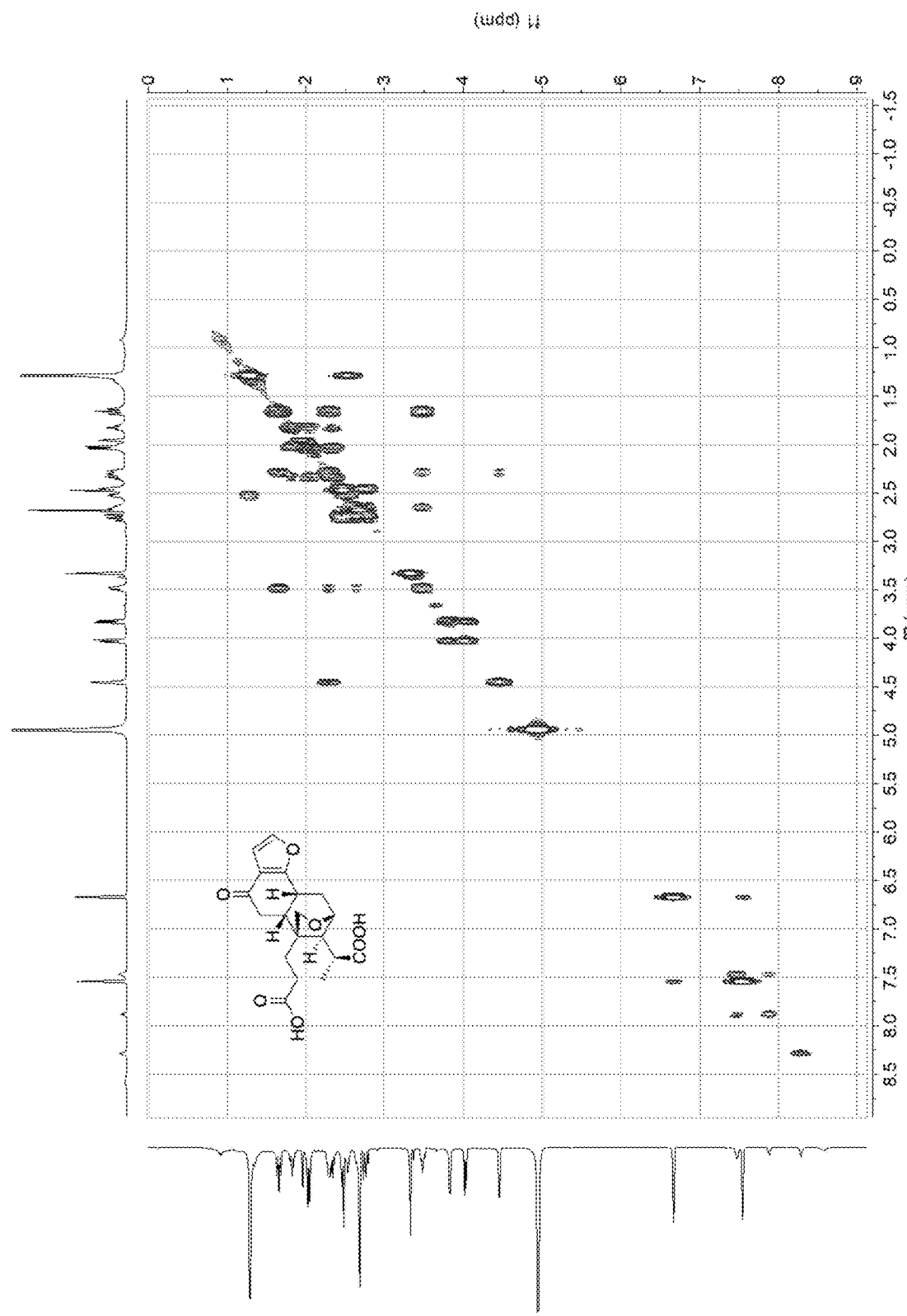
FIG. 4 is a $^1$H-$^1$H COSY spectrum of compound 1 (500 MHz, Methanol-d$_4$).
Figure 5:
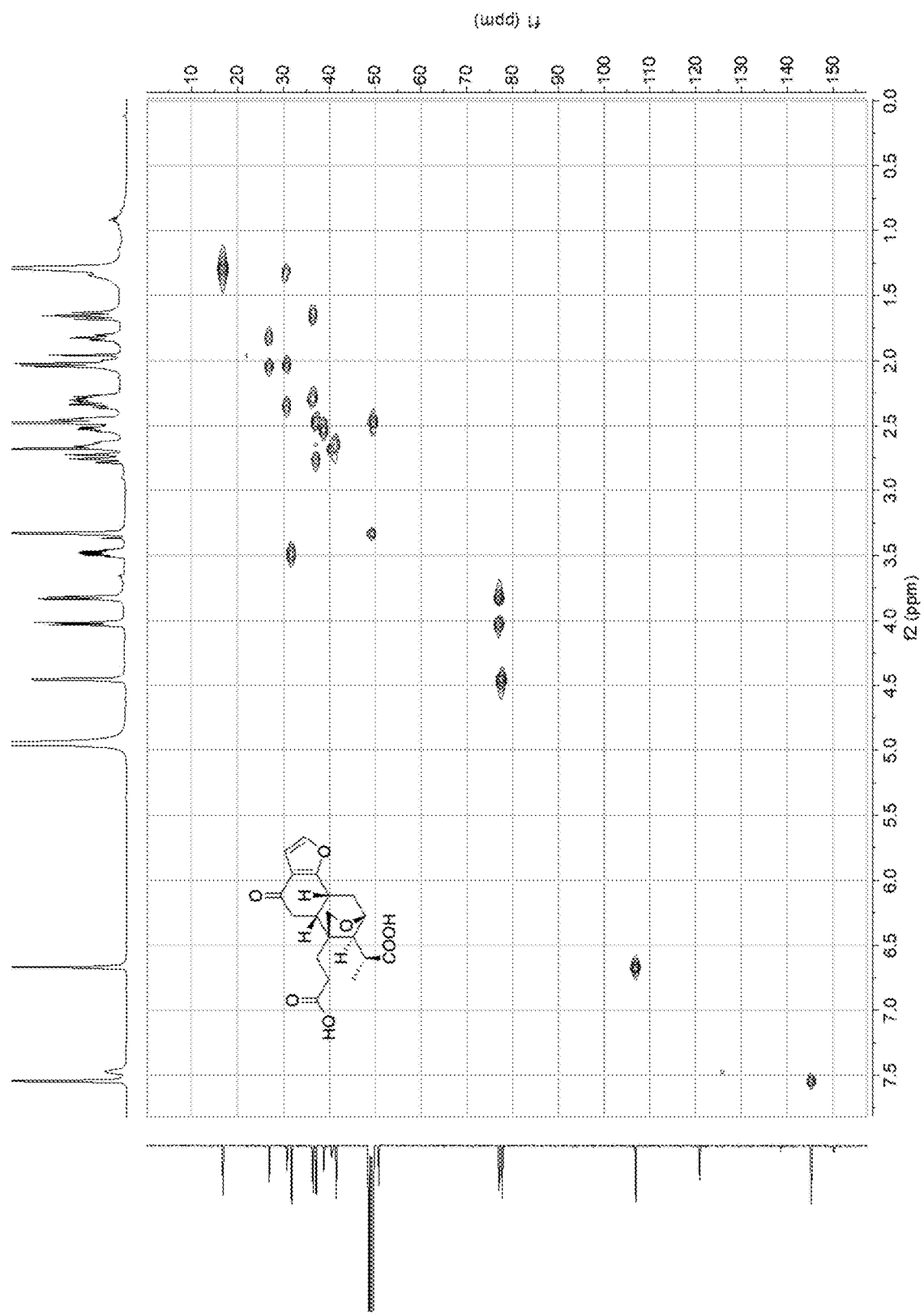
FIG. 5 is a HSQC spectrum of compound 1 ($^1$H: 500 MHz, $^{13}$C: 125 MHz).
Figure 6:
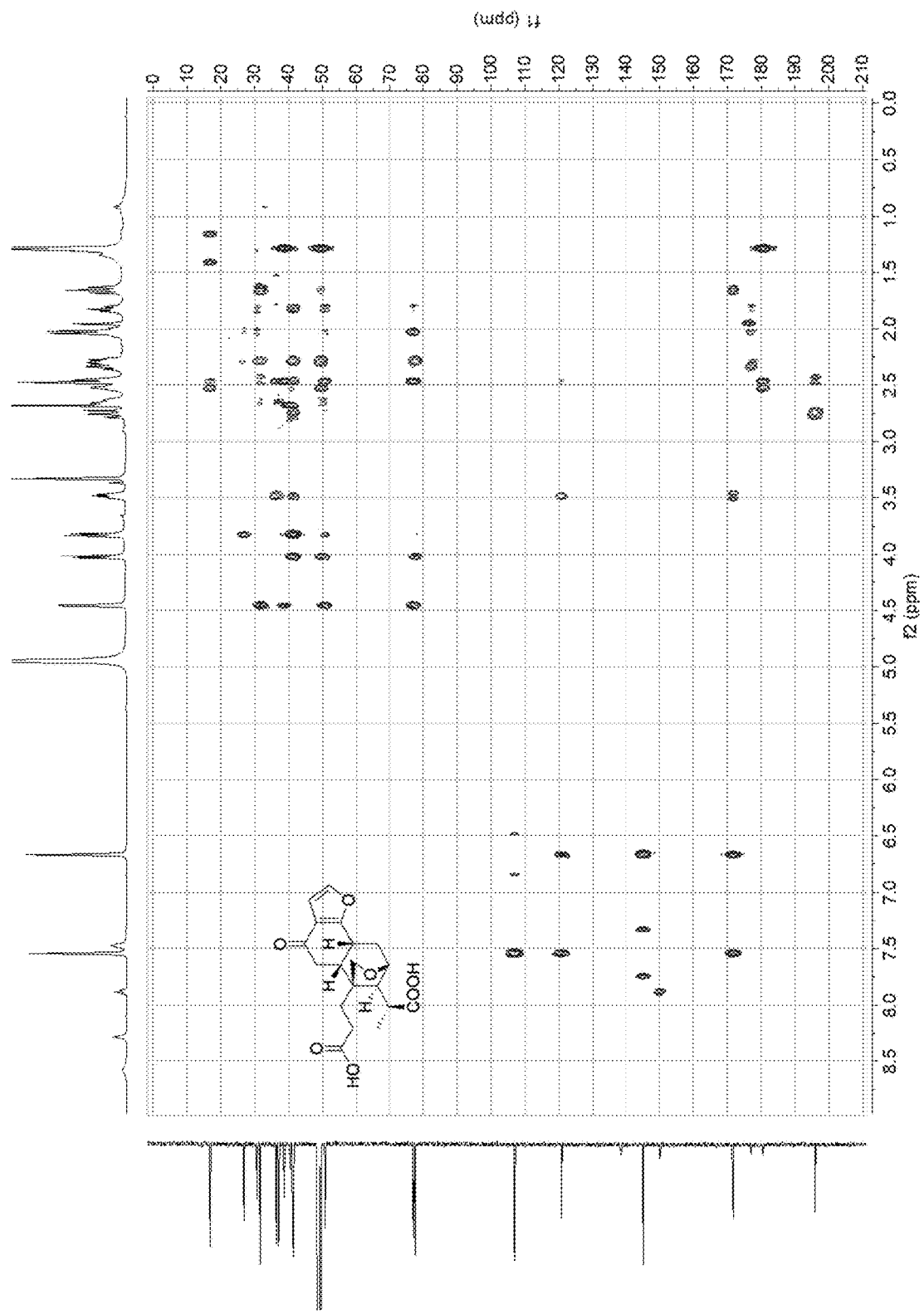
FIG. 6 is a HMBC spectrum of compound 1 ($^1$H: 500 MHz, $^{13}$C: 125 MHz).

1. Instruments and Materials
1.1. Instruments

| Instrument | Manufacturer | Instrument | Manufacturer |
|---|---|---|---|
| ACQUITY UPLC high performance liquid phase | Waters Company of America | EnSpire multifunctional microplate reader | PerkinElmer Company of America |
| CHEETAH ® MP medium pressure preparative chromatography | Tianjin Agela Technologies Co., Ltd. | TDL-80-2B centrifugal machine | Shanghai Anting Co., Ltd. |
| Nuclear magnetic resonance instrument Bruker AV-500 | Bruker Company of Germany | S-B50L vertical pressure steam sterilizer | Jiangsu Jintan Medical Instrument Factory |
| Shimadzu LC-20 AR preparative high performance liquid chromatographic instrument | Shimadzu Company of Japan | Adjustable pipette | Eppendorf Company of America |
| R-300 rotary evaporator | BUCHI Limited Company of Switzerland | Multi-tube vortex oscillator | Spectral Calibration (Dongguan) Laboratory Technology Co., Ltd. |
| Intelligent artificial climate box PRX-150B | Ningbo Saifu Experimental Instrument Co., Ltd. | Microporous plate thermostatic oscillator | Hangzhou Miu Instruments Co., Ltd. |
| Quitix 125 D-1CN electronic scale | Sartorius Scientific Instruments Co., Ltd. | 7500 Real Time PCR System | Applied Biosystems |
| Milli-Q Advantage system ultrapure water instrument | Millipore Company of America | IS-RDV1 constant temperature oscillator | Crystal Technology & Industries, Inc. of America |

-continued

| Instrument | Manufacturer | Instrument | Manufacturer |
|---|---|---|---|
| KQ-250E ultrasonic cleaner | Kunshan Hechuang Ultrasonic Instrument Co., Ltd. | PrimoStar inverted microscope | ZEISS Company of Germany |
| 1300 series A2 clean bench | Thermo Company of America | SIM-F140AY65-PC ice machine | Panasonic Co., Ltd. of Japan |
| BWS-10 thermostat water bath kettle | Shanghai Yiheng Technology Instrument Co., Ltd. | Forma series II water jacket $CO_2$ incubator | Thermo Company of America |

1.2. Experimental Materials

Hedera ODS preparative chromatographic column (10 nm, 5 μm, 10 mm×250 mm); Waters ACQUITY UPLC BEH C18 (2.1 mm×100 mm, 1.7 μm) chromatographic column; MCI GEL (CHP20, 75 μm to 150 μm), Sephadex LH-20 gel, and column chromatography silica gel (200 meshes to 300 meshes); chromatographic acetonitrile, methanol and formic acid purchased from Merck Company of America; and analytical petroleum ether and ethyl acetate purchased from Nanjing Wanqing Chemical Reagent Co., Ltd.

A preparation method of a compound was implemented by the following steps:

(1) 1.3 kg of dry *I. oliviformis* leaves were weighed and crushed, added with 13 L of ethanol with a volume concentration of 95% to soak and extract medicinal materials at room temperature for three times, each time for 12 hours, and filtered, and then a filtrate was collected, and concentrated under a reduced pressure until non-alcoholic taste existed to obtain an extractum.

(2) The extractum obtained in the step (1) was prepared into a suspension with 1000 mL of water, and then extracted with petroleum ether, ethyl acetate and n-butanol respectively for four times to obtain a petroleum ether fraction, an ethyl acetate fraction, an n-butanol fraction and a raffinate fraction respectively.

(3) The n-butanol fraction obtained in the step (2) was mixed with a sample according to sample:MCI=1:1.2, and subjected to medium-pressure preparative-MCI column chromatographic gradient elution (with an MCI particle size of 75 μm to 150 μm, 3.0 cm×60.0 cm, and a column volume of 400 mL) with methanol-water as a mobile phase for elution, wherein A was pure water, and B was methanol; elution gradients comprised: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; 70.00 minutes to 90.00 minutes, 55% to 55% B; 90.00 minutes to 110.00 minutes, 65% to 65% B; 110.00 minutes to 130.00 minutes, 75% to 75% B; and 130.00 minutes to 160.00 minutes, 75% to 100% B; an elution flow rate was 20 mL/min, and detection wavelengths were 250 nm and 310 nm. After analysis by high-performance liquid chromatography, the eluates were concentrated and combined by a rotary evaporator to obtain four fractions Bu-1 to Bu-4.

(4) The fraction Bu-1 obtained in the step (3) was subjected to medium-pressure preparative-MCI column chromatographic gradient elution (with an MCI particle size of 75 μm to 150 μm, 3.0 cm×60.0 cm, and a column volume of 400 mL) with methanol-water as a mobile phase for elution, wherein A was pure water, and B was methanol; elution gradients comprised: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; and 70.00 minutes to 120.00 minutes, 45% to 95% B; an elution flow rate was 20 mL/min, and detection wavelengths were 250 nm and 310 nm. After analysis by high-performance liquid chromatography, the eluates were concentrated and combined by a rotary evaporator to obtain 13 fractions Bu-1-1 to Bu-1-13.

(5) The fraction Bu-1-7 obtained in the step (4) was purified by reversed-phase $C_{18}$ preparative high-performance liquid chromatography (Hedera ODS, 5 μm, 2.1 mm×250 mm) with pure water (A)-acetonitrile (B) as a mobile phase for isocratic elution ($CH_3CN$—$H_2O$, v/v, 41:59), wherein detection wavelengths were 250 nm and 310 nm, a flow rate was 3 mL/min, and a column temperature was 30° C., and a stock solution of the compound 1 was collected in a period of 53 minutes to 57 minutes. The stock solution of the compound 1 was purified by preparative high-performance liquid chromatography to obtain a monomer compound 1 (2.6 mg), wherein a high-performance liquid chromatographic column pressure was 9.8 MPa, a chromatographic column was Hedera ODS, a column temperature was 22° C. to 26° C., the mobile phase was pure water-acetonitrile at a volume ratio of 60:40, an injection volume was 100 μL, a flow rate was 3 mL/min, and a detection wavelength was 250 nm.

(6) The fraction Bu-2 obtained in the step (3) was subjected to medium-pressure preparative-MCI column chromatographic gradient elution (with an MCI particle size of 75 μm to 150 μm, 3.0 cm×60.0 cm, and a column volume of 400 mL) with methanol-water as a mobile phase for elution, wherein A was pure water, and B was methanol; elution gradients comprised: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; 70.00 minutes to 90.00 minutes, 55% to 55% B; and 90.00 minutes to 130.00 minutes, 55% to 95% B; an elution flow rate was 20 mL/min, and detection wavelengths were 250 nm and 310 nm. After analysis by high-performance liquid chromatography, the eluates were concentrated and combined by a rotary evaporator to obtain 11 fractions Bu-2-1 to Bu-2-11.

(7) The fraction Bu-2-10 obtained in the step (6) was purified by reversed-phase $C_{18}$ semi-preparative high-performance liquid chromatography (Hedera ODS, 5 µm, 1.5 mm×250 mm) with pure water (A)-acetonitrile (B) as a mobile phase for isocratic elution ($CH_3CN$—$H_2O$, v/v, 40:60), wherein detection wavelengths were 250 nm and 310 nm, a flow rate was 3 mL/min, and a column temperature was 30° C., and a stock solution of the compound 2 was collected in a period of 50 minutes to 54 minutes. The stock solution of the compound 2 was purified by semi-preparative high-performance liquid chromatography to obtain compound 2 (4.41 mg), wherein a high-performance liquid chromatographic column pressure was 9.8 MPa, a chromatographic column was Hedera ODS, a column temperature was 22° C. to 26° C., the mobile phase was pure water-acetonitrile at a volume ratio of 60:40, an injection volume was 80 µL, a flow rate was 3 mL/min, and a detection wavelength was 250 nm.

3. Structural Analysis of Compounds:

3.1 Structural Identification of Secoicacinlivitholide F (1)

The compound 1 was white powder, $[\alpha]_D^{20}$ –10.0 (c 0.01, MeOH), and combined with $^{13}C$

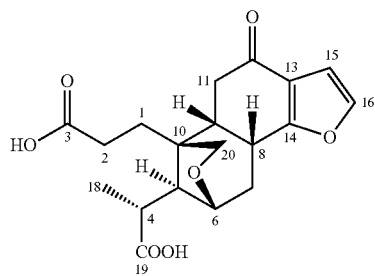

NMR data and a quasi-molecular ion peak m/z 363.1426 ([M+H]+, a calculated value of $C_{19}H_{23}O_7^+$ was 363.1444) given by a high-resolution mass spectrum (HRESIMS), a molecular formula of the compound could be deduced to be $C_{19}H_{22}O_7$, with an unsaturation degree of 9. A hydrogen spectrum of the compound 1 (Table 1) showed a signal with 1 methyl proton $\delta_H$ (1.29, d, $CH_3$-18) and a signal with 2 alkene protons $\delta_H$ (6.67, d, H-15; 7.54, d, H-16). A $^{13}C$ NMR spectrum and a DEPT spectrum showed that the compound had a signal with 19 carbons, comprising 1 methyl carbon, 5 methylene carbons (including 1 oxygen-bond methylene), 7 methine carbons (including 1 oxygen-bond methine), 3 quaternary carbons (including 1 oxy-generated tertiary carbon) and 3 carbonyl carbons. According to analysis of $^1H$ and $^{13}C$ NMR data of the compound 1, the compound 1 had 2 methylenes $\delta_C$ (30.7, C-1; 26.8, C-2), 1 carboxyl $\delta_C$ (177.0, C-3), 2 methines $\delta_C$ (38.7, C-4; 46.9, C-5) and 1 quaternary carbon $\delta_C$ (50.8, C-10). The above evidence showed that, in the compound 1, rupture and ring-opening occurred between C-3 and C-4. In addition, an HMBC spectrogram showed that $H_2$-20 was related to C-6 ($\delta_C$ 77.6), which indicated the existence of 6,20-epoxy bridge. A plane structure of the compound 1 was further confirmed by $^1H$-$^1H$ COSY, HSQC and HMBC spectra.

Figure 7:
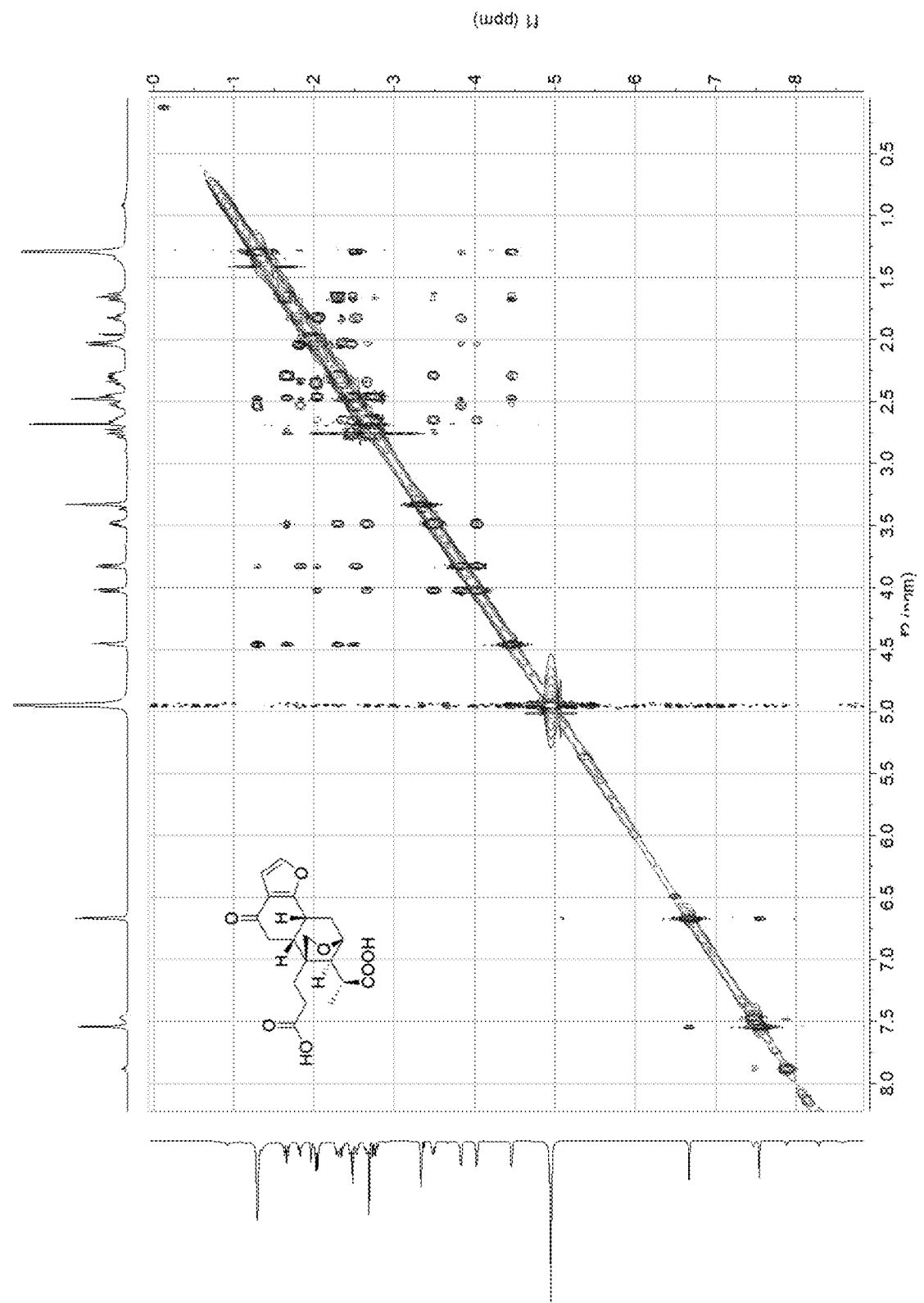
FIG. 7 is a NOSEY spectrum of compound 1 (500 MHz, Methanol-d$_4$).
Figure 8:
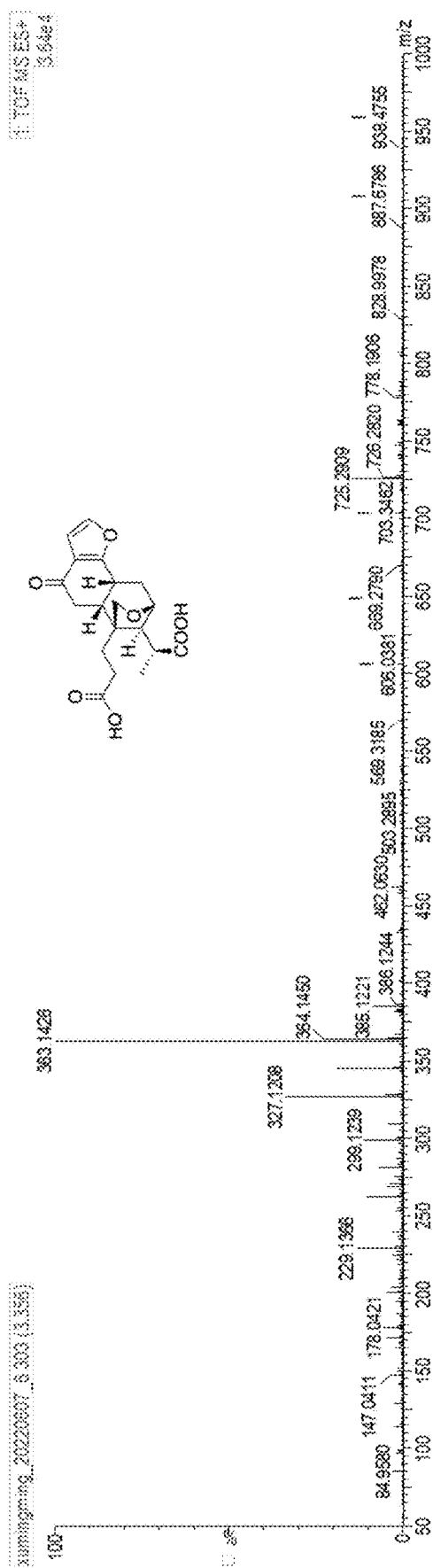
FIG. 8 is a mass spectrum of compound 1.
Figure 9:
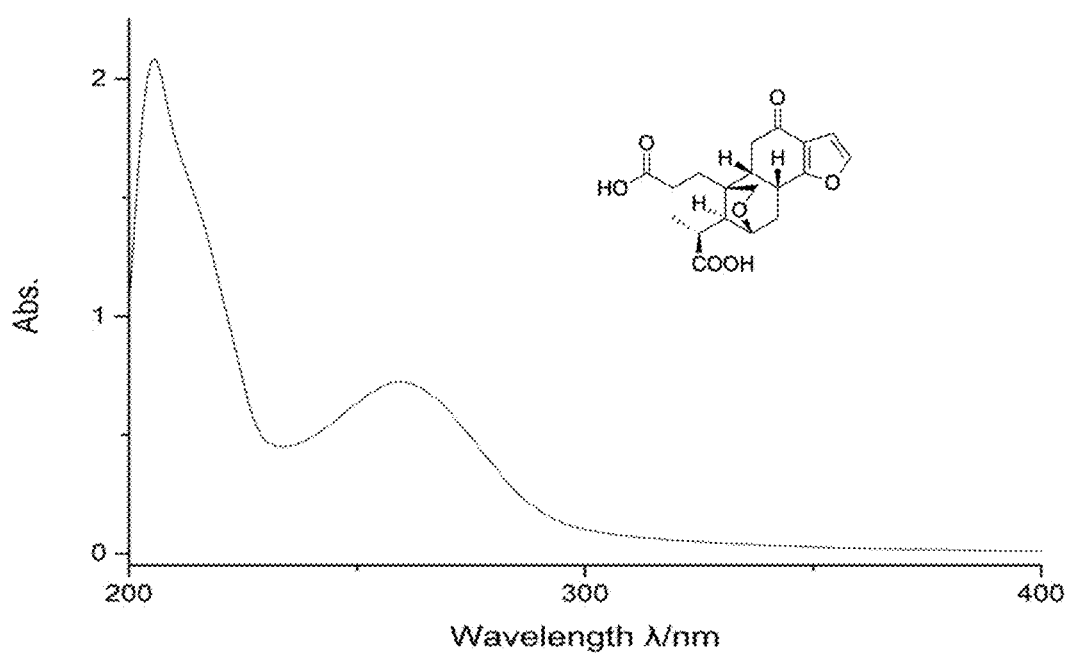
FIG. 9 is a UV spectrum of compound 1.
Figure 10:
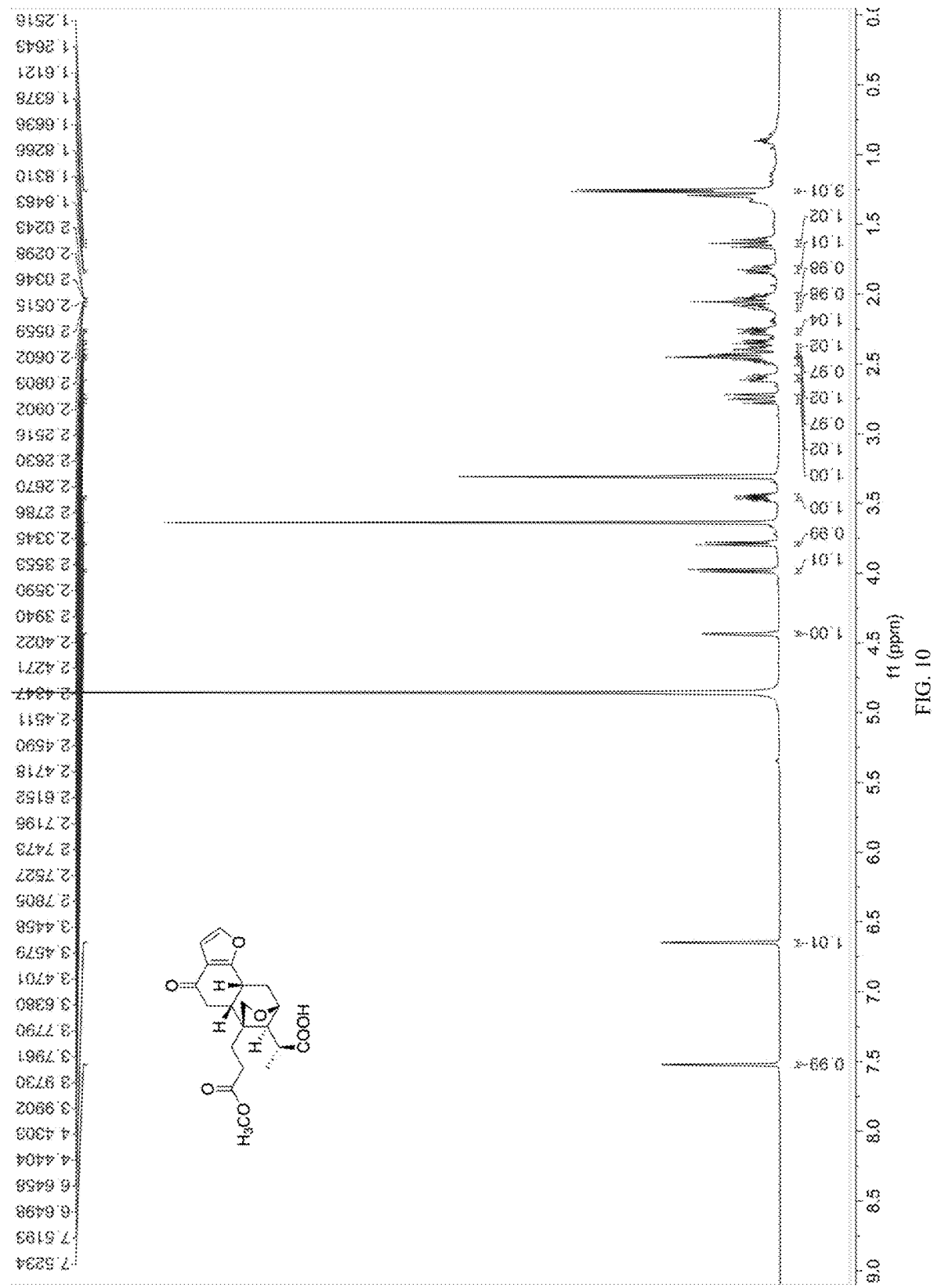
FIG. 10 is a $^1$H NMR spectrum of compound 2 (500 MHz, Methanol-d$_4$).
Figure 11:
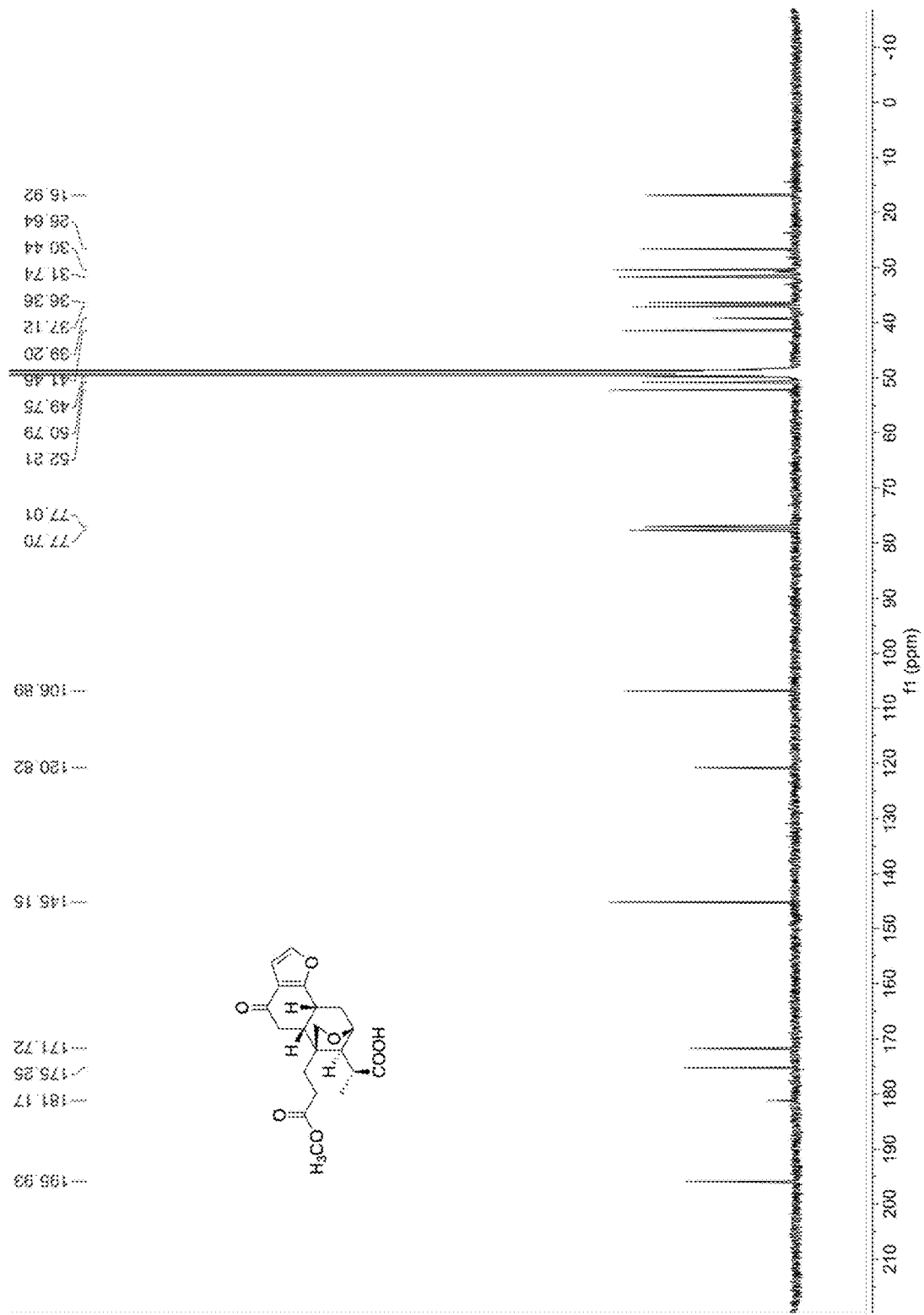
FIG. 11 is a $^{13}$C NMR spectrum of compound 2 (125 MHz, Methanol-d$_4$)
Figure 12:
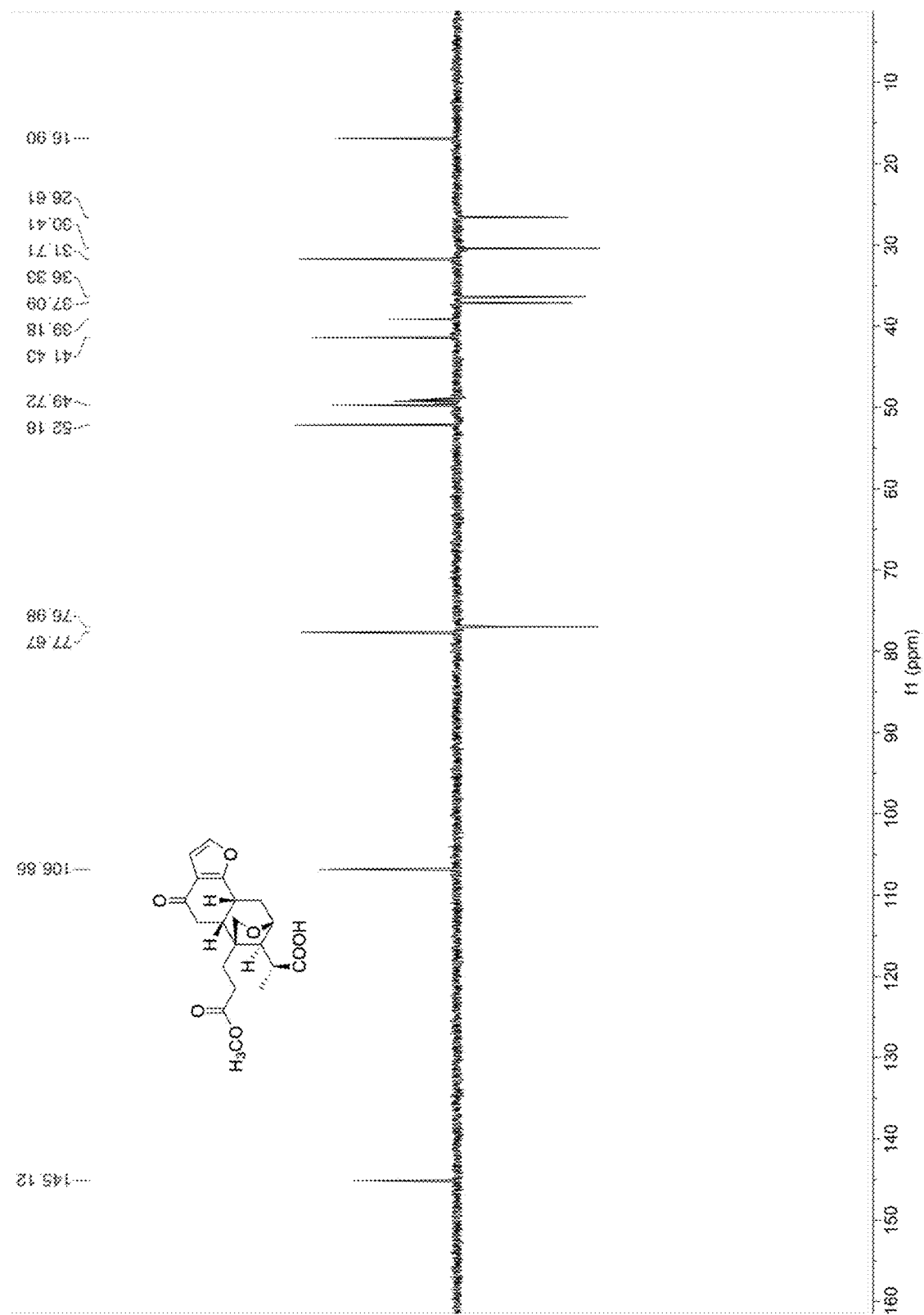
FIG. 12 is a DEPT 135 spectrum of compound 2 (125 MHz, Methanol-d$_4$).
Figure 13:
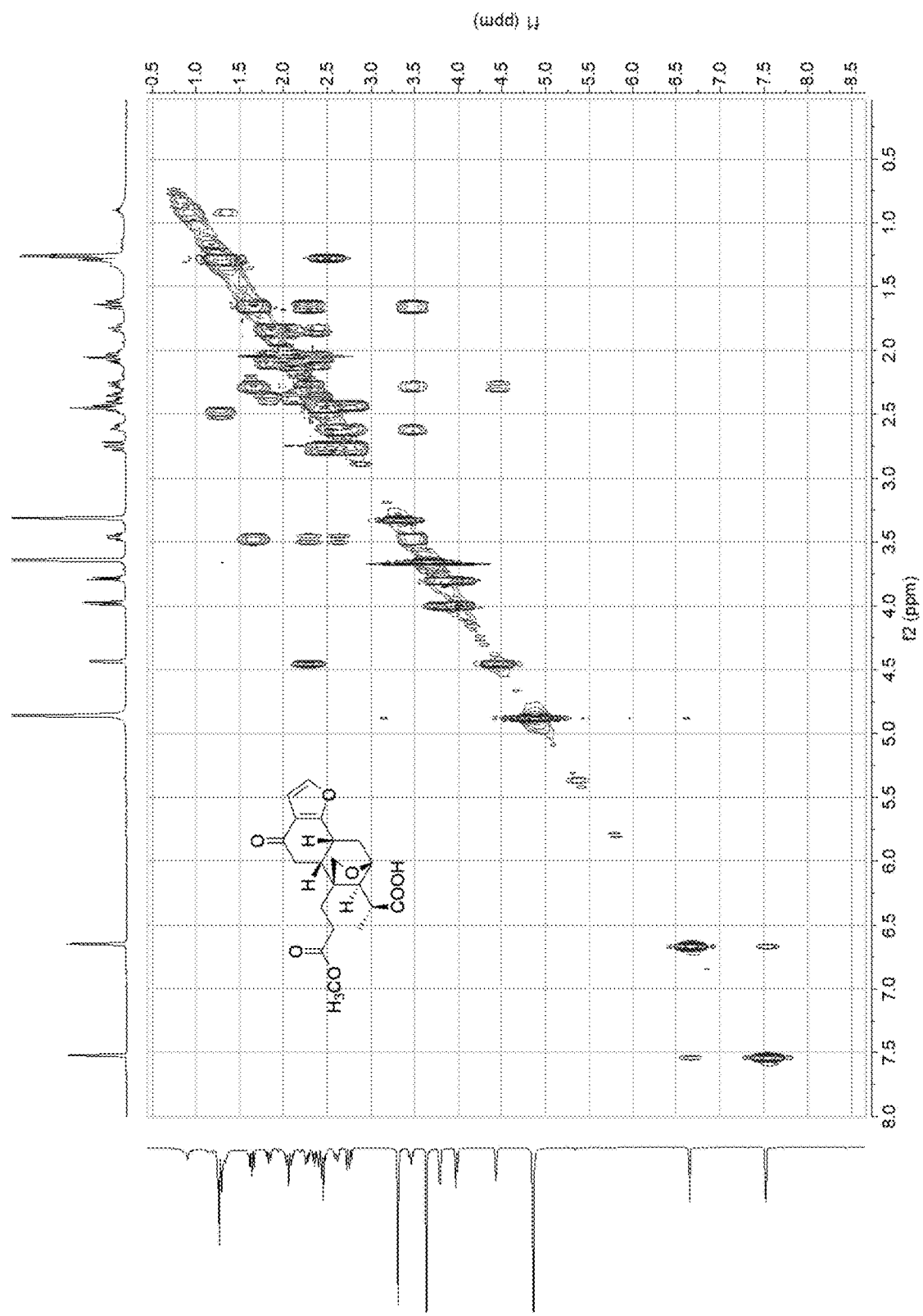
FIG. 13 is a $^1$H-$^1$H COSY spectrum of compound 2 (500 MHz, Methanol-d$_4$).
Figure 14:
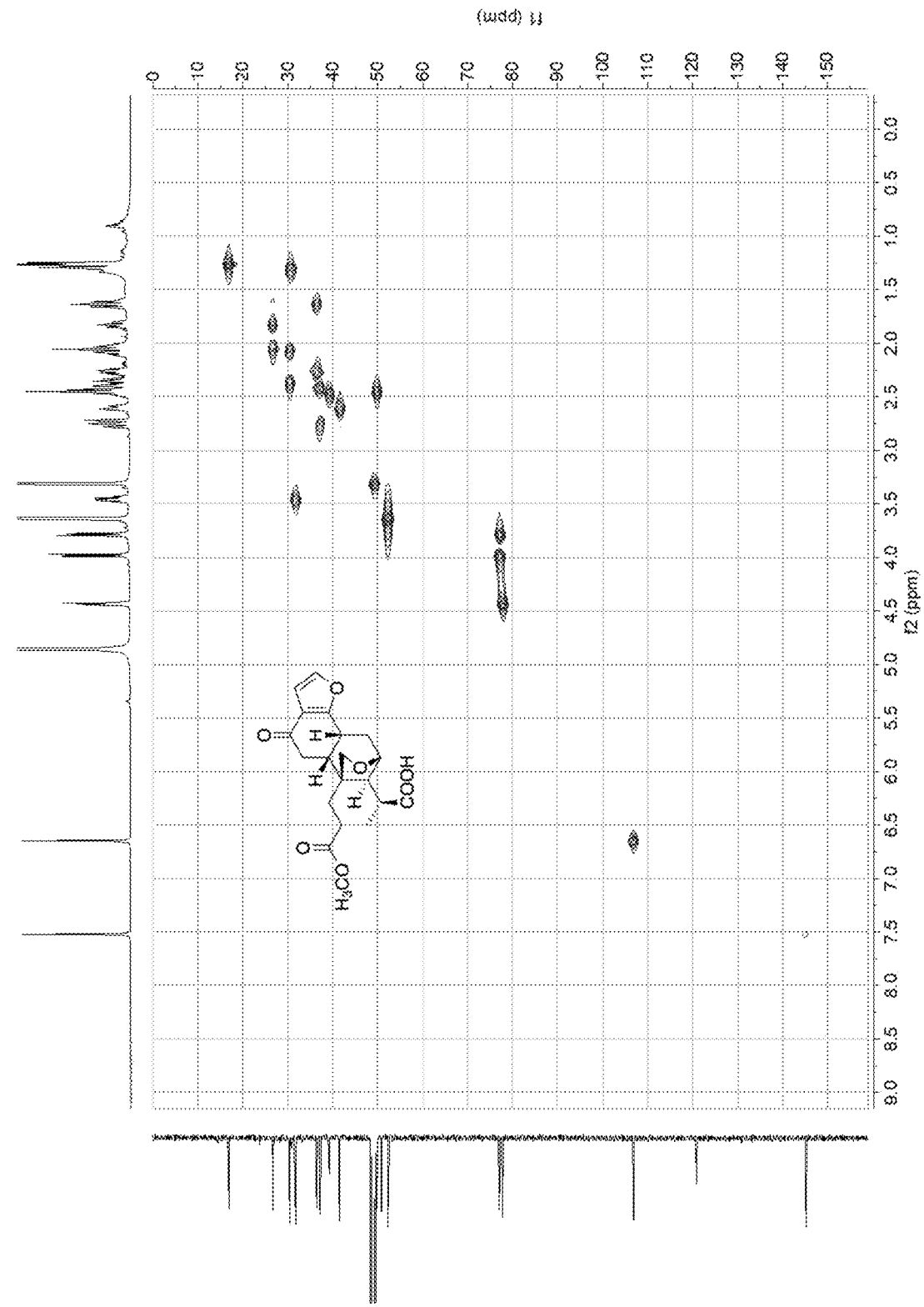
FIG. 14 is a HSQC spectrum of compound 2 ($^1$H: 500 MHz, $^{13}$C: 125 MHz).
Figure 15:
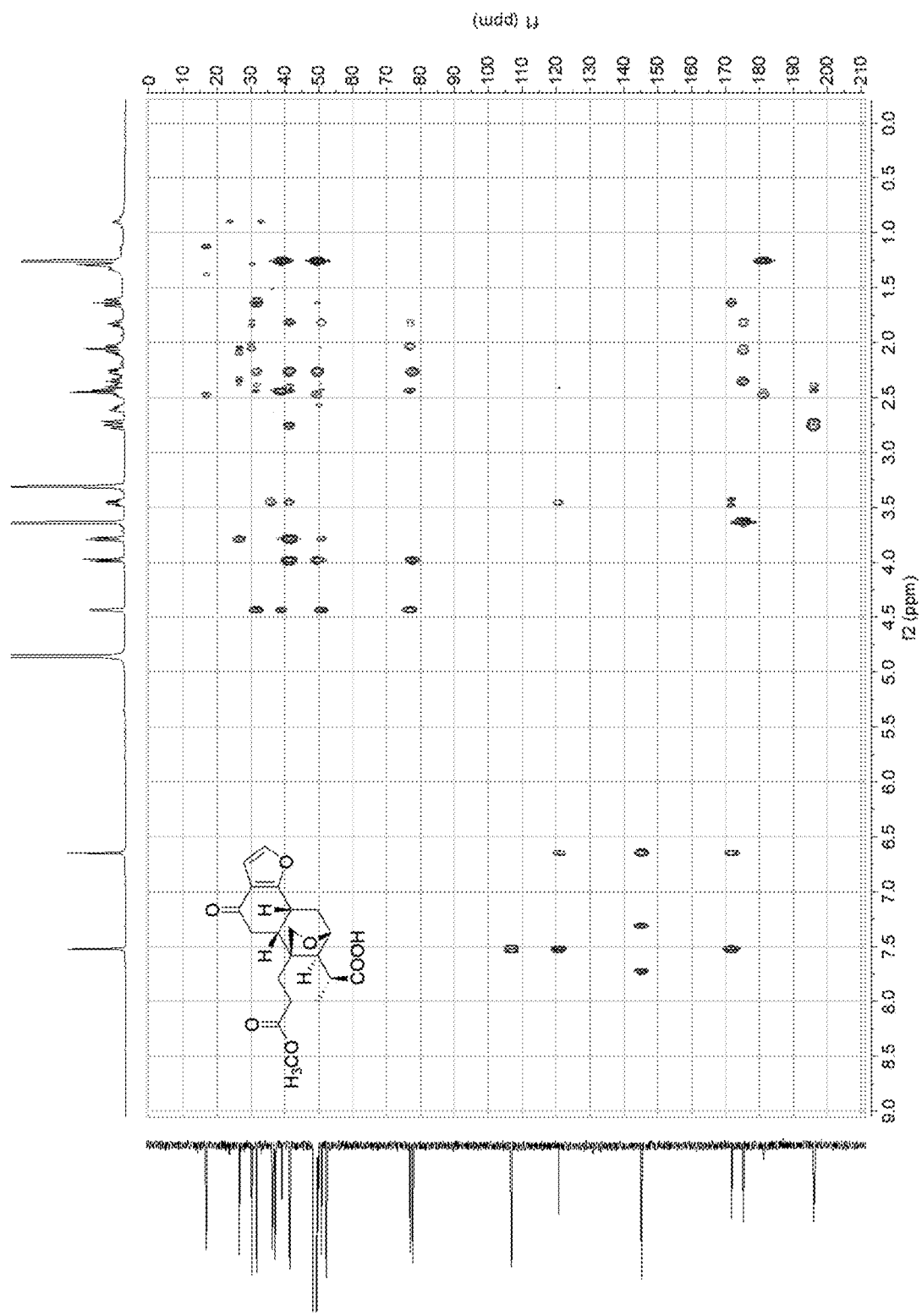
FIG. 15 is a HMBC spectrum of compound 2 ($^1$H: 500 MHz, $^{13}$C: 125 MHz).
Figure 16:
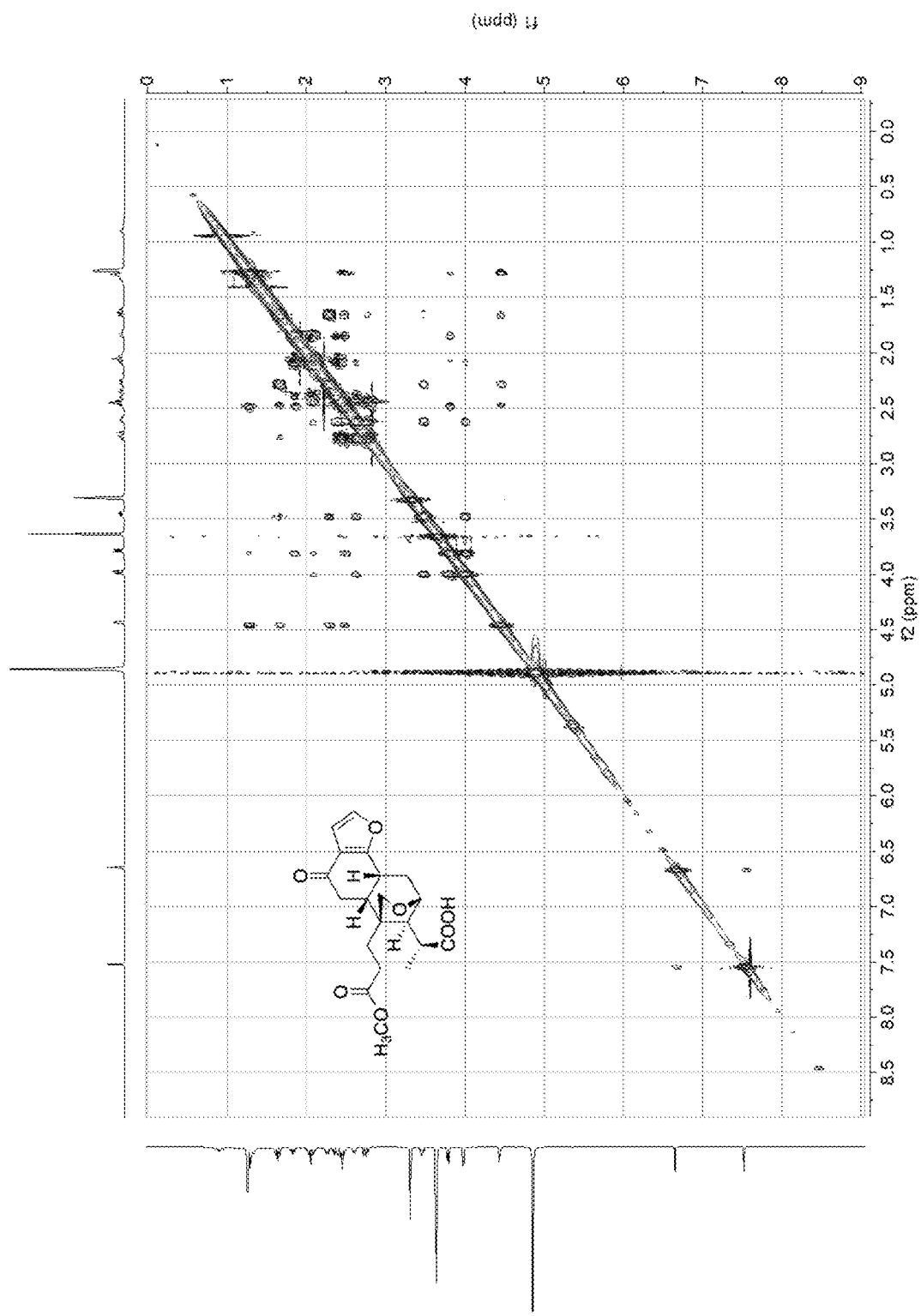
FIG. 16 is a NOSEY spectrum of compound 2 (500 MHz, Methanol-d$_4$).
Figure 17:
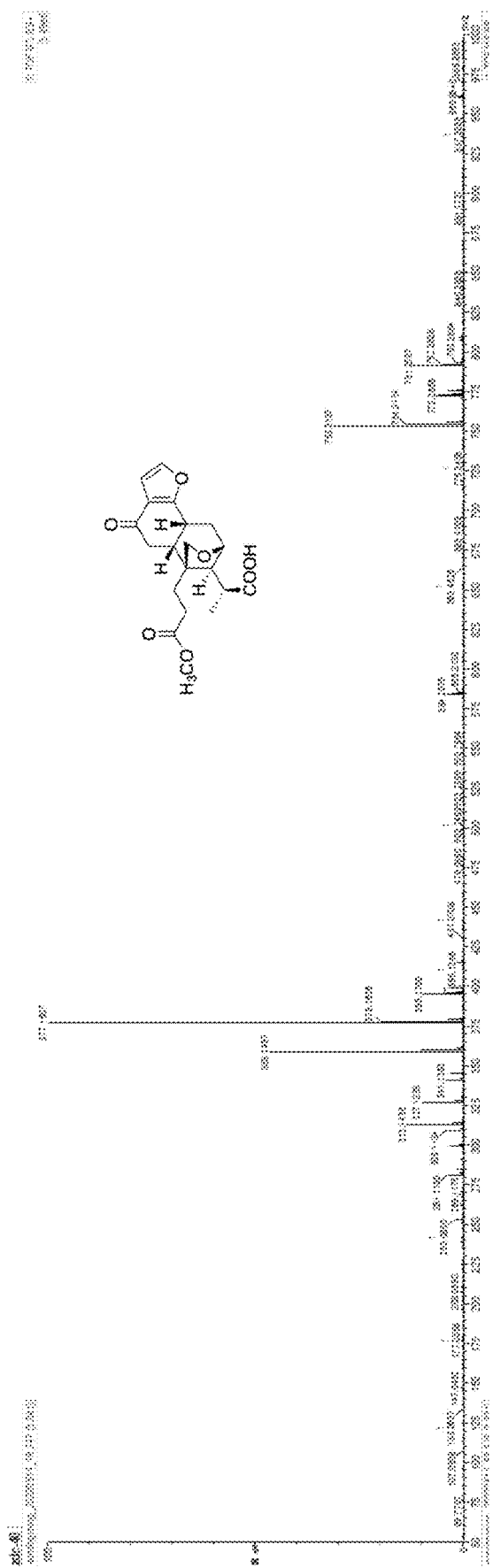
FIG. 17 is a mass spectrum of compound 2.
Figure 18:
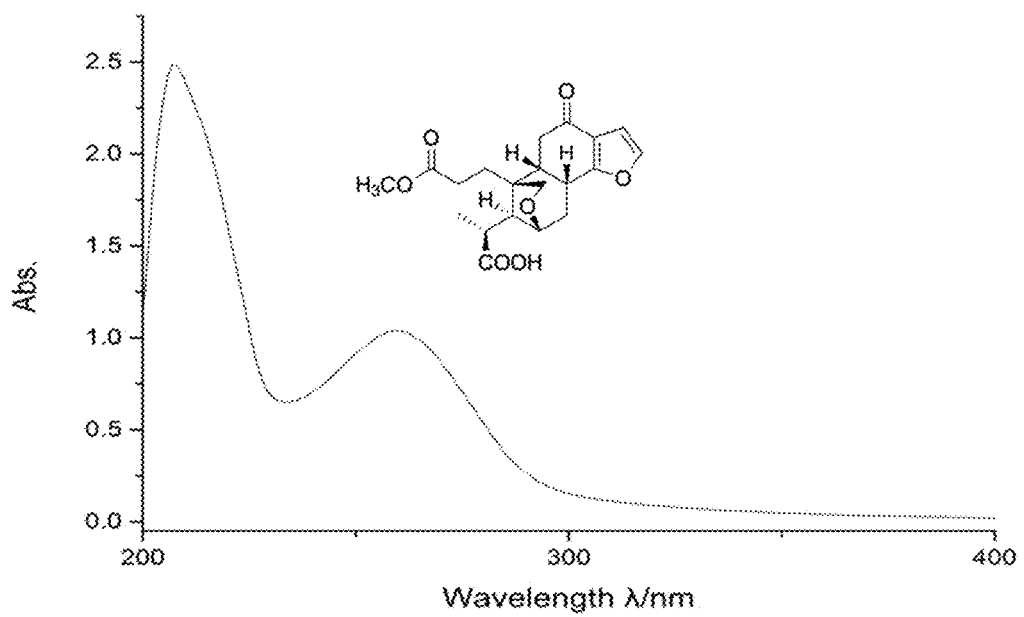
FIG. 18 is a UV spectrum of compound 2.

A relative configuration of the compound 1 was determined by analyzing an NOESY spectrum (FIG. 7). Up to now, diterpenoid compounds separated from plants of Icacina were all (9β-H)-pimarane and a derivative thereof. Therefore, H-5 in the compound 1 was defined as being α-oriented. It could be observed from the NOESY spectrum that H-5 ($\delta_H$ 2.48) was related to H-6 ($\delta_H$ 4.46) and $CH_3$-18 ($\delta_H$ 1.29), which indicated that the H-5/H-6/$CH_3$-18 were all α-oriented. H-4 ($\delta_H$ 2.54) was related to H-20β ($\delta_H$ 3.83), and H-20α ($\delta_H$ 4.02) was related to H-8 ($\delta_H$ 3.48) and H-9 ($\delta_H$ 2.65), which indicated that the H-8/H-9/$H_2$-20 were all β-oriented. Therefore, a structure of the compound 1 was determined, and the compound was named secoicacinliveholide F. The compound 1 was the first novel 3,4-seco-17-nor-pimarine skeleton compound with the 6,20-epoxy bridge found in nature.

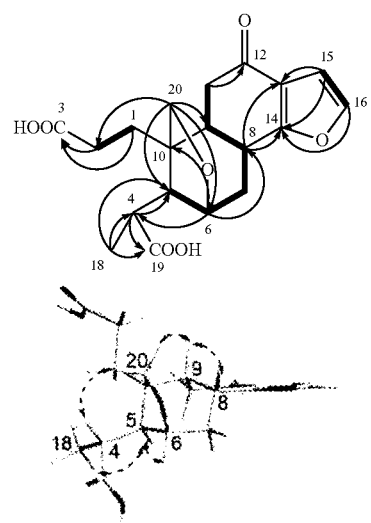

3.2 Structural Identification of Secoicacinlivitholide G (2)

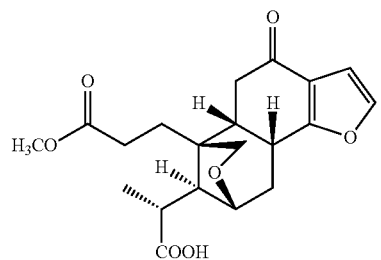

The compound 2 was white powder, $[\alpha]_D^{20}$ –20.0 (c 0.02, MeOH), and combined with $^{13}C$ NMR data and a quasi-molecular ion peak m/z 377.1607 ([M+H]+, a calculated value of $C_{20}H_{25}O_7^+$ was 377.1600) given by a high-resolution mass spectrum (HRESIMS), a molecular formula of the compound could be deduced to be $C_{20}H_{24}O_7$, with an unsaturation degree of 9. $^1H$-NMR and $^{13}C$-NMR spectra of the compounds 2 and 1 were compared, and it was found that the compound 2 had one more methoxyl than the compound 1. The HMBC spectrum showed that $OCH_3$ ($\delta_H$ 3.64, $\delta_C$ 52.2) was related to C-3 ($\delta_C$ 175.2), which indicated that the methoxyl was linked with the C-3. Therefore, the compound 2 could be determined to be a 3-methoxyl derivative of the compound 1. A plane structure of the compound 2 was further confirmed by $^1H$-$^1H$ COSY, HSQC and HMBC spectra, and the compound was named secoicacinlivitholide G. A relative configuration of the compound 2 was the same as that of the compound 1.

2

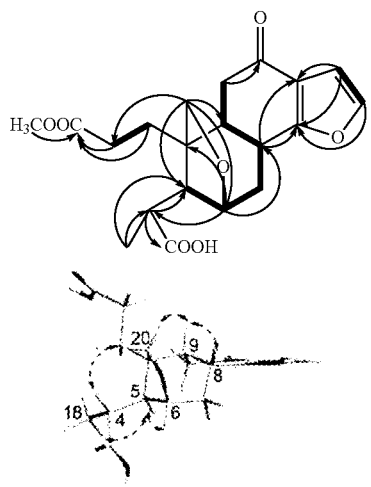

TABLE 1

$^1$H and $^{13}$C NMR data of compounds 1 and 2 ($^1$H, 500 MHz; $^{13}$C, 125 MHz)

| | 1 | | 2 | |
|---|---|---|---|---|
| no. | $\delta_H$ (J in Hz) | $\delta_C$ | $\delta_H$ (J in Hz) | $\delta_C$ |
| 1α | 2.35, m | 30.7 | 2.39, dd (10.7, 5.0) | 30.4 |
| 1β | 2.03, m | | 2.10, dd (10.7, 5.0) | |
| 2α | 2.29, dd (10.8, 6.9) | 26.8 | 2.02, dd (10.7, 5.0) | 26.6 |
| 2β | 1.82, m | | 1.84, m | |
| 3 | | 177.0 | | 175.2 |
| 4 | 2.54, d (9.2, 6.8) | 38.7 | 2.48, dd (9.2, 6.3) | 39.2 |
| 5 | 2.48, m | 49.6 | 2.44, m | 49.7 |
| 6 | 4.46, d (5.0) | 77.6 | 4.44, d (5.0) | 77.7 |
| 7α | 2.29, dd (13.0, 5.0) | 36.4 | 2.27, dd (13.4, 5.0) | 36.4 |
| 7β | 1.66, t (13.0) | | 1.66, t (13.4) | |
| 8 | 3.48, dt (12.4, 6.0) | 31.7 | 3.46, dt (12.1, 5.6) | 31.7 |
| 9 | 2.65, dt (13.7, 6.0) | 41.4 | 2.60, dt (13.9, 5.6) | 41.5 |
| 10 | | 50.8 | | 50.8 |
| 11α | 2.76, m | 37.1 | 2.75, m | 37.1 |
| 11β | 2.48, m | | 2.45, m | |
| 12 | | 195.9 | | 195.9 |
| 13 | | 120.8 | | 120.8 |
| 14 | | 171.7 | | 171.7 |
| 15 | 6.67, d (2.0) | 106.9 | 6.65, d (2.0) | 106.9 |
| 16 | 7.54, d (2.0) | 145.2 | 7.52, d (2.0) | 145.1 |
| 18 | 1.29, d (6.8) | 16.8 | 1.26, d (6.3) | 16.9 |
| 19 | | 180.5 | | 181.2 |
| 20α | 4.02, d (8.7) | 77.0 | 3.98, d (8.6) | 77.0 |
| 20β | 3.83, d (8.7) | | 3.79, d (8.6) | |
| 3-OCH$_3$ | | | 3.64, s | 52.2 |

Embodiment 2

An anti-colon cancer activity test research of the present invention was carried out by the following steps.

1. Culture of Tumor Cells

Colon cancer cell lines HT-29 and SW620 (cell bank of Chinese Academy of Sciences) were cultured in a DMEM culture solution containing 10% fetal bovine serum (Gibco Company of America) at 37° C. under 5% $CO_2$. During subculturing, a dish of tumor cells was taken out first, the culture solution was removed, and 3 mL of PBS was added to wash the cells twice; 1 mL of trypsin was added for digestion, 1 mL of culture solution was added after 2 minutes to stop the digestion, and the mixture was centrifuged at 1000 r/min and room temperature for 5 minutes; and a supernatant was removed, 1 mL of DMEM culture medium containing 10% fetal bovine serum was added, and the mixture was resuspended to obtain a cell suspension.

2. Preparation of Experimental Drugs

Proper amounts of the compounds 1 and 2 prepared in the above Embodiment 1 were weighed and dissolved in DMSO, so that mother solutions had a final concentration of 4 mM and were stored in a refrigerator at 4 C. Before the experiment, the mother solutions were diluted with a DMEM culture medium, so as to make drugs have a concentration of 20 μM and ensure that the DMSO had a final concentration lower than 0.1%. Different volumes of DMEM culture media were added to dilute the compounds into different concentrations. Meanwhile, a DMEM culture medium containing 0.1% DMSO was used as a negative control.

Toxicities of Drugs to Tumor Cell Lines

Tumor cells were suspended in a culture medium, inoculated into a 96-well plate (100 μL/well) by a cell density of $6×10^3$, and cultured at 37° C. under 5% $CO_2$ for 24 hours. In a logarithmic growth period of the tumor cell lines, different concentrations of compounds were added to culture the cells at 37° C. under 5% $CO_2$ for 24 hours.

Detection of Cell Viability by MTT Method

After 24 hours of interaction between the drugs and the tumor cells, 20 μL of MTT solution (5 mg/mL) was added into each well to incubate the cells in a sterile incubator for 3 hours. A supernatant was removed completely, and 150 μL of DMSO was added into each well to react on a shaker for 30 minutes, so as to dissolve bluish violet formazan crystals. An OD value was determined at a wavelength of 570 nm with a microplate reader. $IC_{50}$ (median inhibitory concentration) values of the compounds were calculated by GraphPad Prism 8 software, and 5-FU was used as a positive control.

Experimental results referred to Table 2:

TABLE 2

Inhibiting effects of compounds 1 and 2 on colon cancer cell lines ($IC_{50}$: μM)

| | $IC_{50}$ ± SD | |
|---|---|---|
| Compound | HT-29 | SW620 |
| 1 | >20 | / |
| 2 | 3.12 ± 1.63 | 9.92 ± 1.68 |
| 5-FU | 9.18 ± 1.61 | 14.18 ± 1.43 |

Experimental conclusion: it is found from the anti-colon cancer cell activity evaluation of the compounds 1 and 2 that the compound 2 has remarkable anti-proliferation effects on two colon cancer cell lines HT-29 and SW620, and the effects are both stronger than those of the positive drug 5-FU, The inhibiting effect of the compound 2 on the colon cancer cell line HT-29 is about three times that of the positive drug 5-FU, so that the compound has the potential to develop a new anti-colon cancer drug.

What is claimed is:

1. A method of treating colon cancer comprising administering a (9β-H)-pimarane skeleton diterpenoid having the structure

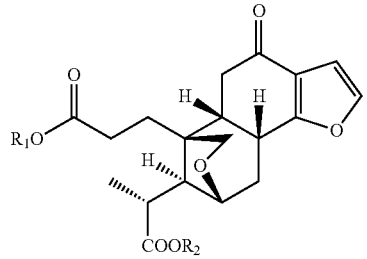

to a subject in need thereof, wherein $R_1$ and $R_2$ are hydrogen, acyl, glycosyl, alkyl, cycloalkyl, alkylaryl, aryl, arylalkyl, arylalkenyl, arylalkynyl, or heterocyclyl.

2. The method for treating colon cancer according to claim 1, wherein the (9β-H)-pimarane skeleton diterpenoid has a structural formula shown as:

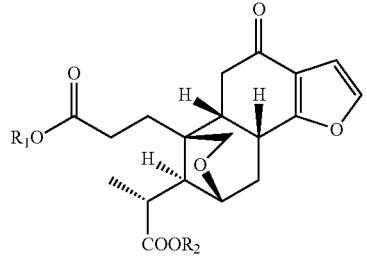

wherein, R1 is hydrogen or methyl, and R2 is hydrogen.

3. The method for treating colon cancer according to claim 2, wherein the (9β-H)-pimarane skeleton diterpenoid is prepared by the following steps of:
(1) weighing and crushing 1.3 kg of dry *I. oliviformis* leaves, adding 13 L of ethanol with a volume concentration of 95% to extract at room temperature for three times, each time for 12 hours, filtering the mixture and then collecting a filtrate, and concentrating the filtrate by vacuum evaporation until non-alcoholic taste to obtain an extractum;
(2) preparing the extractum obtained in the step (1) into a suspension with a proper amount of water, and then extracting the suspension with petroleum ether, ethyl acetate and n-butanol respectively for four times to obtain a petroleum ether fraction, an ethyl acetate fraction, an n-butanol fraction and a raffinate fraction respectively;
(3) mixing the n-butanol fraction obtained in the step (2) with a sample according to sample:MCI=1:1.2, and subjecting the mixture to medium-pressure preparative-MCI column chromatographic gradient elution with methanol-water as a mobile phase for elution, wherein A is pure water, and B is methanol; elution gradients comprise: 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; 70.00 minutes to 90.00 minutes, 55% to 55% B; 90.00 minutes to 110.00 minutes, 65% to 65% B; 110.00 minutes to 130.00 minutes, 75% to 75% B; and 130.00 minutes to 160.00 minutes, 75% to 100% B; an elution flow rate is 20 mL/min, and detection wavelengths are 250 nm and 310 nm; and after analysis by high-performance liquid chromatography, concentrating and combining the eluates to obtain four fractions Bu-1 to Bu-4;
(4) subjecting the eluate flow fraction Bu-1 of 47.00 minutes to 55.00 minutes obtained in the step (3) to MCI reversed-phase medium-pressure preparative gradient elution with methanol-water as a mobile phase, wherein A is pure water, and B is methanol; elution gradients comprise 0.01 minute to 10.00 minutes, 5% to 5% B; 10.00 minutes to 20.00 minutes, 15% to 15% B; 20.00 minutes to 30.00 minutes, 25% to 25% B; 30.00 minutes to 50.00 minutes, 35% to 35% B; 50.00 minutes to 70.00 minutes, 45% to 45% B; and 70.00 minutes to 120.00 minutes, 45% to 95% B; an elution flow rate is 20 mL/min, and detection wavelengths are 250 nm and 310 nm; collecting the eluate Bu-1-7 of 55.00 minutes to 65.00 minutes; subjecting the fraction Bu-1-7 to isocratic elution by semi-preparative high-performance liquid chromatography with pure water A and acetonitrile B at a volume ratio of 59:41 as a mobile phase, and collecting a stock solution of the compound 1 in a period of 53 minutes to 57 minutes; and purifying the stock solution of the compound 1 by semi-preparative high-performance liquid chromatography to obtain compound secoicacinlivitholide F, the preparative high-performance liquid chromatography has a chromatographic column pressure of 9.8 MPa, a column temperature of 22° C. to 26° C., the mobile phase of pure water-acetonitrile at the volume ratio of 60:40, an injection volume of 100 μL, a flow rate of 3 mL/min, and a detection wavelength of 250 nm, the structural formula of compound ecoicacinlivitholide F is as follows:

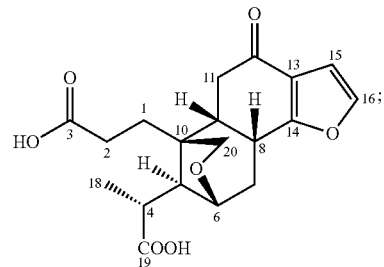

and
(5) subjecting the eluate flow fraction Bu-2 of 55.00 minutes to 63.00 minutes obtained in the step (3) to MCI reversed-phase medium-pressure preparative gradient elution with methanol-water as a mobile phase for elution, wherein A is pure water, and B is methanol; elution gradients comprise: 0.01 minute to 10.00 minutes, 5% to 5% B; 10.00 minutes to 20.00 minutes, 15% to 15% B; 20.00 minutes to 30.00 minutes, 25% to 25%

B; 30.00 minutes to 50.00 minutes, 35% to 35% B; 50.00 minutes to 70.00 minutes, 45% to 45% B; and 70.00 minutes to 90.00 minutes, 55% to 55% B; and 90.00 minutes to 130.00 minutes, 55% to 95% B; an elution flow rate is 20 mL/min, and detection wavelengths are 250 nm and 310 nm; collecting the eluate Bu-2-10 of 65.00 minutes to 74.00 minutes; subjecting the fraction Bu-2-10 to isocratic elution by preparative high-performance liquid chromatography with pure water A and acetonitrile B at a volume ratio of 60:40 as a mobile phase, and collecting a stock solution of the compound 2 in a period of 50 minutes to 54 minutes; and purifying the stock solution of the compound 2 by semi-preparative high-performance liquid chromatography to obtain compound secoicacinlivitholide G, the semi-preparative high-performance liquid chromatography has a chromatographic column pressure of 9.8 MPa, a column temperature of 22° C. to 26° C., the mobile phase of pure water-acetonitrile at the volume ratio of 60:40, an injection volume of 80 μL, a flow rate of 3 mL/min, and a detection wavelength of 250 nm, the structural formula of compound secoicacinlivitholide G is as follows:

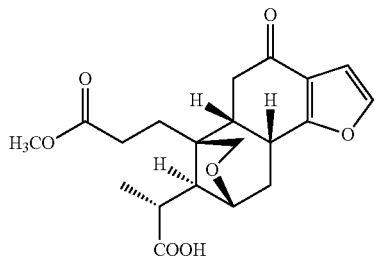

* * * * *